Dec. 4, 1928.
N. T. SHORTS
TIRE VALVE STEM AND PRESSURE GAUGE
Filed April 6, 1927
1,694,286
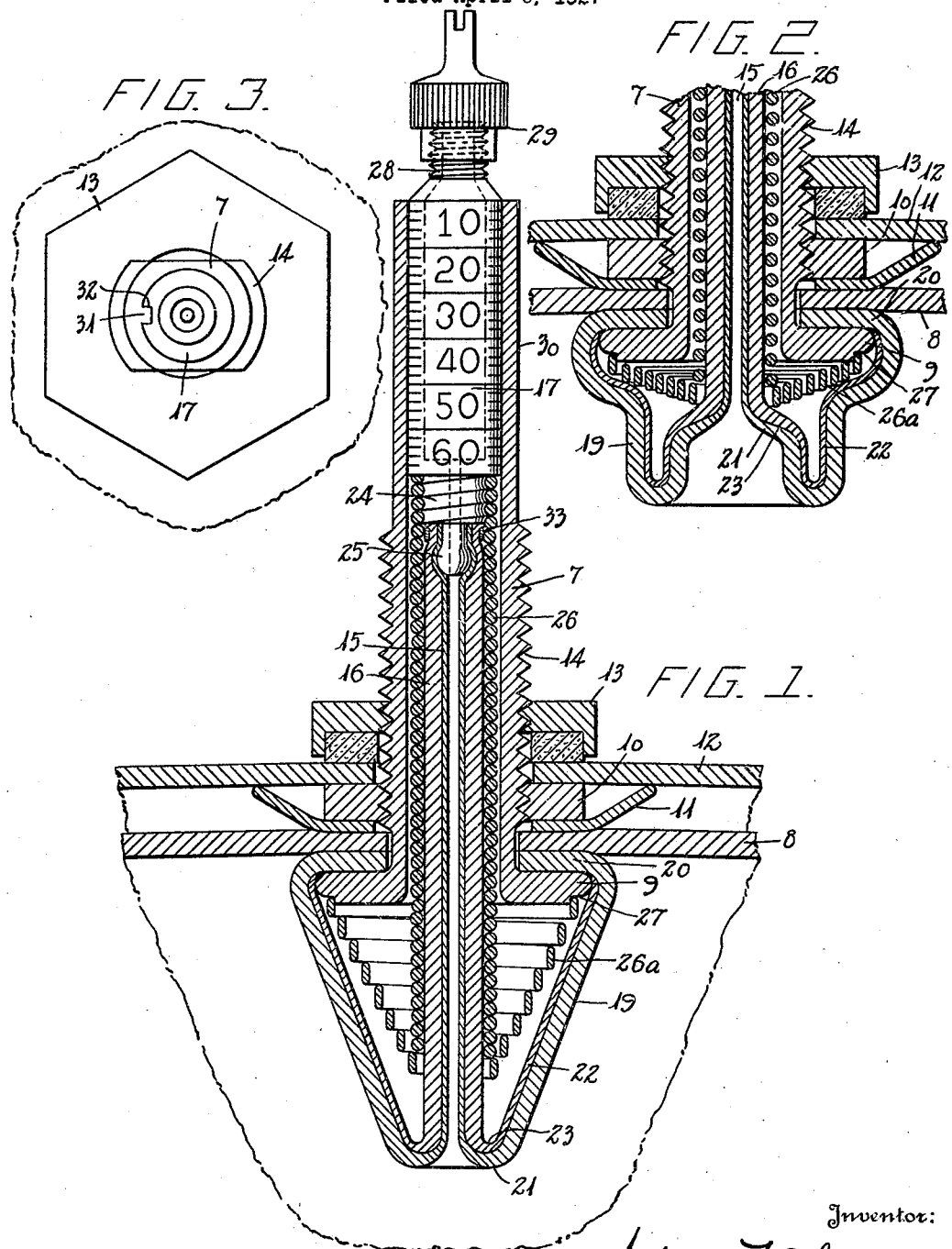

Patented Dec. 4, 1928.

1,694,286

UNITED STATES PATENT OFFICE.

NELSON T. SHORTS, OF FERN, PENNSYLVANIA.

TIRE VALVE STEM AND PRESSURE GAUGE.

Application filed April 6, 1927. Serial No. 181,443.

The present invention relates to pressure gauges for pneumatic tires, and aims to provide a novel and improved tire valve stem and pressure gauge.

Another object of the invention is the provision of a device of that kind adapted to be secured to the inner tube of a tire and having a bulb within the tire tube which when collapsed by the air pressure will indicate the pressure.

A further object is the provision of such a device comprising a novel assembly of elements including a bulb and spring to be disposed within the inner tube of the tire, and an indicating member movable with said bulb.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a medium section of the device, portions being shown in elevation.

Fig. 2 is a fragmentary sectional view, corresponding with Fig. 1, and showing the bulb collapsed.

Fig. 3 is an end view of the device with the cap removed.

In carrying out the invention there is provided a barrel 7 which corresponds with the barrel of an ordinary valve stem of an inner tube of a pneumatic tire, said barrel 7 extending through an aperture in the inner tube 8 and having a disk-like flange 9 at that end of the barrel within the tube. The nut 10 is threaded on the barrel 7 to clamp the tube 8 between said flange 9 and nut 10, the usual elongated washer 11 being disposed between the nut 10 and tube 8.

The barrel 7 extends through an aperture in the wheel rim 12, and a nut 13 is threaded on the barrel 14 to bear against the rim 12 to close the aperture thereof and prevent displacement of the barrel 7. The threaded portion 14 of the barrel 7 has opposite flat sides similar to ordinary tire valve stems, and the washer 11 has a hole of corresponding form to prevent said washer from turning. In fact, the threaded portion 14 of the barrel 7, nuts 10 and 13 and washer 11 are similar to those now used on ordinary valve stems.

A tube 15 extends into the barrel 7 from the inner end thereof and has a sleeve 16 thereon, and the outer end of the tube 15 is connected with a plunger or indicating member 17 slidable within the outer end portion of the barrel 7, the member or plunger 17 being graduated to indicate, at the end of the barrel 7, the pressure of air in the tire, as will hereinafter more fully appear.

The gist of the invention resides in the provision of a bulb 19 within the tire tube 8 between the inner ends of the barrel 7 and tube 15 for moving said tube 15 and member 17 in proportion to the air pressure. The bulb 19 is composed of rubber or other flexible material and is of conical form as shown, being provided with the inturned flange 20 at its larger diametered end, which flange is clamped between the flange 9 and tube 8, the nut 10 when tightened clamping the washer 11, tube 8 and bulb flange 20 between said nut 10 and barrel flange 9. As shown, the tube 15 is integral with the bulb 19, being composed of rubber or other flexible material, and the inner end of said tube and smaller end portion of the bulb are united, as at 21. The bulb 19 has a lining or shield 22 therein, composed of heavy fabric or other suitable flexible material, and as shown the lining 22 is integral with the sleeve 16, same being made of similar material, and the inner end of the sleeve being united with the smaller end portion of the lining, as at 23. The lining 22 may be thin, as shown, and the sleeve 16 of thicker dimensions, in order that the sleeve will resist the expansion of the tube 15 under the air pressure. The tube 15 and sleeve 16 are flexible so as to be capable of being bent to either side within the tire tube, such as when the vehicle is run with the tire flat or deflated. This will avoid breakage of or injury to any of the parts of the device should the vehicle be run with a deflated tire.

The inner end of the member 17 has a reduced screw-threaded boss 24 from which a nipple 25 extends, and the outer end of the tube 15 and sleeve 16 are slipped on the nipple 25 and made fast thereon by a clamping ring 33 embracing them. Thus, the member 17 is movable longitudinally with the tube 15.

A coiled wire spring 26 surrounds the sleeve 16 within the barrel 7 and extends into the bulb 19, and said spring is provided at its inner end with a conical or spiral portion 26ª extending reversely and surrounding a portion of the cylindrical body of the spring, with the larger diametered portion seating in a rabbet 27 with which the flange 9 is provided. The outer end portion of the spring 26 is connected to the member 17 by screw-threading the outer terminal of the spring on the boss 24. Thus, when the member 17 is moved outwardly the cylindrical portion of the spring is stretched or brought under tension, while the conical portion 26ª of the spring is compressed or collapsed toward a flat position against the flange 9, as seen in Fig. 2. The portion 26ª of the spring, as shown, is integral with the cylindrical body 26 of the spring, being made from the same length of wire, but the portion 26ª is flattened into ribbon form before being coiled, so that the convolutions of the portion 26ª are increased in width longitudinally of the axis of the spring, thereby avoiding the possibility of the walls of the bulb 19 being forced inwardly between the convolutions of the portion 26ª of the spring.

The outer end of the member 15 has a screw-threaded portion 28 to receive the usual cap 29, and the outer end portion of the barrel 7 is smooth in order to receive a slip cap (not shown) to enclose the cap 29 and outer terminal of the indicating member 17. The barrel 7 has an inwardly extending key or lug 31 received by a longitudinal groove 32 in the member 17 to prevent said member from rotating, but permitting it to slide longitudinally.

The device serves as a valve stem, the tire being readily inflated through the member 17 and tube 15 when the cap 29 is removed, and the usual valve element is located within the member 17 to prevent escape of air from the tire.

The pressure of air within the tire is indicated by the projection of the member 17 from the barrel 7, the air pressure in acting against the bulb 19 causing said bulb to collapse toward the flange 9 and larger or base end of the bulb. Thus, as the air pressure increases the bulb 19 is collapsed and the height of the bulb decreases, said bulb moving toward a collapsed condition, as seen in Fig. 2. The outward movement of the tube 15, by the collapsing of the bulb, will move the member 17 outwardly to indicate the air pressure, and the spring 26 resists the outward movement of the parts, and moves them inwardly as the air pressure is reduced. The portion 26ª of the spring restricts the collapsing of the bulb, and by using the bulb 19 and spring within the tire, they may be of larger diameter than corresponding elements heretofore used within the barrels of pressure gauges, and the bulb and spring may be larger and more rugged in construction, whereby the device will have greater life and efficiency.

The spring is a combination tension and compression spring, inasmuch as the cylindrical or helical portion of the spring stretches by the outward movement of the member 17, while the portion 26ª of the spring is compressed during such movement. The convolutions of the helical portion of the spring are thus separated, as seen in Fig. 2, and the convolutions of the portion 26ª of the spring moved together toward a flat condition, when the bulb is collapsed and the member 17 moved outwardly under air pressure.

The sleeve 16 is also of fabric or other suitable material so as to prevent expansion of the tube 15 as well as stretching of said tube and sleeve, although the inner projecting portions of the tube and sleeve may bend with the bulb 19 should the tire become deflated. Thus, the bulb, tube 15 and sleeve 16 being bent in any direction within the tire will not result in injury to or breakage of any of the parts.

Having thus described the invention, what is claimed as new is:—

1. A tire pressure gauge comprising a barrel, an indicating member slidable therein, a flexible member connected to the indicating member and projecting from the inner end of the barrel, the bulb connected to the inner end of the barrel and said flexible member, and a coiled spring surrounding said flexible member and having its outer end connected to said indicating member, said spring extending within the bulb and having a reversely extending conical portion bearing against the inner end portion of the barrel.

2. A tire pressure gauge comprising a barrel having a flange at its inner end, an indicating member slidable in the barrel, a flexible member connected to said indicating member and projecting from the inner end of the barrel, a bulb having a flange to engage the barrel flange, said bulb being connected with said flexible member, and a coiled spring surrounding said flexible member and connected at its outer end with said indicating member, said spring having a conical portion within the bulb seating against said barrel flange.

3. A tire pressure gauge comprising a barrel, a hollow indicating member slidable therein, a flexible tube connected to said indicating member and projecting from the barrel, a bulb connected to said flexible tube and barrel to be disposed within a tire, a lining for the bulb, and a sleeve on said tube.

4. A tire pressure gauge comprising a barrel, a hollow indicating member slidable therein, a flexible tube connected to said indicating member and projecting from the barrel, a bulb integral with said tube and adapted to be connected to the barrel, a sleeve on the tube, and a lining for the bulb integral with said tube, said tube, bulb, sleeve and lining being composed of flexible material.

5. A tire pressure gauge comprising a barrel having a flange at its inner end, a hollow indicating member slidable in the barrel, a flexible tube connected to said indicating member and projecting from the inner end of the barrel, a bulb connected to said tube and having a flange to engage the barrel flange, a flexible sleeve on said tube to prevent expansion thereof, a lining for the bulb connected to said sleeve, and a coiled wire spring surrounding said sleeve and connected at its outer end to said indicating member, said spring having a conical portion within the bulb seating against said barrel flange.

In testimony whereof I hereunto affix my signature.

NELSON T. SHORTS.